US007509307B2

(12) United States Patent
Biswal et al.

(10) Patent No.: US 7,509,307 B2
(45) Date of Patent: Mar. 24, 2009

(54) REDUNDANT VERSION INFORMATION IN HISTORY TABLE THAT ENABLES EFFICIENT SNAPSHOT QUERYING

(75) Inventors: Dilip Kumar Biswal, Union City, CA (US); Isaac Kam-Chak Cheng, San Jose, CA (US); Cecilia O. Chu, El Dorado Hills, CA (US); Donald Lee Clare, Morgan Hill, CA (US); Louis S. W. Mau, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 11/039,528

(22) Filed: Jan. 19, 2005

(65) Prior Publication Data

US 2006/0161530 A1 Jul. 20, 2006

(51) Int. Cl.
*G06F 7/00* (2006.01)

(52) U.S. Cl. ................................ 707/3; 707/2; 707/203; 707/204

(58) Field of Classification Search ...................... 707/3
See application file for complete search history.

(56) References Cited

U.S. PATENT DOCUMENTS 5,623,661 A 4/1997 Hon ........................... 395/601
5,675,802 A 10/1997 Allen et al.
5,870,758 A 2/1999 Bamford et al.
5,870,759 A 2/1999 Bauer et al.
5,950,210 A * 9/1999 Nelson ....................... 707/203
5,956,713 A 9/1999 Bamford et al.
5,956,731 A 9/1999 Bamford et al.
5,963,959 A * 10/1999 Sun et al. .................... 707/200
5,999,931 A 12/1999 Breitbart et al. ............... 707/10
6,092,086 A 7/2000 Martin et al.
6,289,335 B1 * 9/2001 Downing et al. ............... 707/3
6,295,541 B1 9/2001 Bodner et al.
6,377,960 B1 4/2002 Qiu et al.
6,415,299 B1 * 7/2002 Baisley et al. ............... 707/203
6,460,052 B1 * 10/2002 Thomas et al. .............. 707/203
6,516,327 B1 2/2003 Zondervan et al.
6,631,374 B1 10/2003 Klein et al.
6,665,815 B1 * 12/2003 Goldstein et al. ............. 714/20
6,799,189 B2 9/2004 Huxoll
2002/0029218 A1 3/2002 Bentley et al. .............. 707/100
2002/0174416 A1 * 11/2002 Bates et al. ................. 717/128
2002/0178146 A1 11/2002 Akella et al. .................... 707/2
2003/0131025 A1 * 7/2003 Zondervan et al. .......... 707/200
2003/0149702 A1 8/2003 Saffer et al. ................. 707/102

(Continued)

*Primary Examiner*—Hung T Vy
*Assistant Examiner*—Binh V Ho

(57) ABSTRACT

A method and system for efficient snapshot querying include: providing a first version value for each data in a history table, where the first version value indicates a beginning of a period in which the data is valid; providing at least a second version value for each data in the history table, where the second version value indicates an end of the period in which the data is valid; receiving a request for a version of a database; and retrieving the data with the first version value less than or equal to the requested version and the second version value greater than or equal to the requested version. By maintaining a history table with redundant version information, the method and system are able to provide efficient snapshot querying while also avoiding the overhead burden of conventional approaches. No aggregates, joins, or sub-queries are required to retrieve a snapshot.

5 Claims, 9 Drawing Sheets

VERSION 1

Table T

| key | data |
|---|---|
| 1 | 10 |
| 2 | 20 |

History Table: HT

| key | data | isDeleted | from | to |
|---|---|---|---|---|
| 1 | 10 | false | 1 | ∞ |
| 2 | 20 | false | 1 | ∞ |

VERSION 2

Table T

| key | data |
|---|---|
| 1 | 10 |
| 2 | 8 |

History Table: HT

| key | data | isDeleted | from | to |
|---|---|---|---|---|
| 1 | 10 | false | 1 | ∞ |
| 2 | 20 | false | 1 | 1 |
| 2 | 8 | false | 2 | ∞ |

VERSION 3

Table T

| key | data |
|---|---|
| 1 | 6 |
| 2 | 8 |

History Table: HT

| key | data | isDeleted | from | to |
|---|---|---|---|---|
| 1 | 10 | false | 1 | 2 |
| 2 | 20 | false | 1 | 1 |
| 2 | 8 | false | 2 | ∞ |
| 1 | 6 | false | 3 | ∞ |

U.S. PATENT DOCUMENTS

2004/0010487 A1 1/2004 Prahlad et al. ................. 707/1
2004/0019614 A1 1/2004 Wang
2005/0086263 A1* 4/2005 Ngai et al. ............... 707/104.1
2005/0131964 A1* 6/2005 Saxena ....................... 707/203
2005/0144198 A1* 6/2005 Bergstraesser et al. ...... 707/203
2006/0101092 A1* 5/2006 Ishida et al. ................ 707/203

* cited by examiner

VERSION 1

Table T

| key | data |
|---|---|
| 1 | 10 |
| 2 | 20 |

History Table: HT

| key | data | isDeleted | version |
|---|---|---|---|
| 1 | 10 | false | 1 |
| 2 | 20 | false | 1 |

VERSION 2

Table T

| key | data |
|---|---|
| 1 | 10 |
| 2 | **8** |

History Table: HT

| key | data | isDeleted | version |
|---|---|---|---|
| 1 | 10 | false | 1 |
| 2 | 20 | false | 1 |
| **2** | **8** | false | **2** |

VERSION 3

Table T

| key | data |
|---|---|
| **1** | **6** |
| 2 | 8 |

History Table: HT

| key | data | isDeleted | version |
|---|---|---|---|
| 1 | 10 | false | 1 |
| 2 | 20 | false | 1 |
| 2 | 8 | false | 2 |
| **1** | **6** | false | **3** |

FIG. 1 (Prior Art)

VERSION 1

Table T

| key | data |
| --- | --- |
| 1 | 10 |
| 2 | 20 |

History Table: HT

| key | data | isDeleted | from | to |
| --- | --- | --- | --- | --- |
| 1 | 10 | false | 1 | ∞ |
| 2 | 20 | false | 1 | ∞ |

VERSION 2

Table T

| key | data |
| --- | --- |
| 1 | 10 |
| 2 | **8** |

History Table: HT

| key | data | isDeleted | from | to |
| --- | --- | --- | --- | --- |
| 1 | 10 | false | 1 | ∞ |
| 2 | 20 | false | 1 | **1** |
| **2** | **8** | false | **2** | ∞ |

VERSION 3

Table T

| key | data |
| --- | --- |
| 1 | **6** |
| 2 | 8 |

History Table: HT

| key | data | isDeleted | from | to |
| --- | --- | --- | --- | --- |
| 1 | 10 | false | 1 | **2** |
| 2 | 20 | false | 1 | 1 |
| 2 | 8 | false | 2 | ∞ |
| **1** | **6** | false | **3** | ∞ |

FIG. 4

VERSION 3

Table T

| key | data |
|---|---|
| 1 | 6 |
| 2 | 8 |

History Table: HT

| key | data | isDeleted | from | to |
|---|---|---|---|---|
| 1 | 10 | false | 1 | 2 |
| 2 | 20 | false | 1 | 1 |
| 2 | 8 | false | 2 | ∞ |
| 1 | 6 | false | 3 | ∞ |

INSERT

VERSION 4

Table T

| key | data |
|---|---|
| 1 | 6 |
| 2 | 8 |
| **3** | **30** |

History Table: HT

| key | data | isDeleted | from | to |
|---|---|---|---|---|
| 1 | 10 | false | 1 | 2 |
| 2 | 20 | false | 1 | 1 |
| 2 | 8 | false | 2 | ∞ |
| 1 | 6 | false | 3 | ∞ |
| **3** | **30** | **false** | **4** | ∞ |

FIG. 7

DELETE

VERSION 5

Table T

| key | data |
|---|---|
| ~~1~~ | ~~6~~ |
| 2 | 8 |
| 3 | 30 |

History Table: HT

| key | data | isDeleted | from | to |
|---|---|---|---|---|
| 1 | 10 | false | 1 | 2 |
| 2 | 20 | false | 1 | 1 |
| 2 | 8 | false | 2 | ∞ |
| 1 | 6 | false | 3 | 4 |
| 3 | 30 | false | 4 | ∞ |
| **1** | - | **true** | **5** | ∞ |

UPDATE

VERSION 6

Table T

| key | data |
|---|---|
| 2 | 8 |
| 3 | **888** |

History Table: HT

| key | data | isDeleted | from | to |
|---|---|---|---|---|
| 1 | 10 | false | 1 | 2 |
| 2 | 20 | false | 1 | 1 |
| 2 | 8 | false | 2 | ∞ |
| 1 | 6 | false | 3 | 4 |
| 3 | 30 | false | 4 | 5 |
| 1 | - | true | 5 | ∞ |
| **3** | **888** | **false** | **6** | ∞ |

REDUNDANT VERSION INFORMATION IN HISTORY TABLE THAT ENABLES EFFICIENT SNAPSHOT QUERYING

FIELD OF THE INVENTION

The present invention relates to data retrieval and more particularly to snapshot querying of a database.

BACKGROUND OF THE INVENTION

The need to retrieve snapshots of a table in a database is known in the art. The requested snapshot may be of a previous version of the table. Several conventional approaches exist for retrieving such a snapshot. A first conventional approach periodically backs up the entire database. The entire database is then restored to retrieve the snapshot of each table in the database. A second conventional approach periodically creates static tables. When creating a static table, all the data from a dynamic table is copied into a static table. After the copying finishes, the static table becomes a snapshot of the dynamic table. However, these approaches require burdensome overhead during the creation and deletion of snapshots and thus is not practical for mobile database applications.

A third conventional approach maintains a history table with a single version or timestamp associated with each historical value of each row in a dynamic table. FIG. 1 illustrates this third conventional approach. Version 1 illustrates two entries in table T with keys '1' and '2'. The history table HT maintains a single version value associated with each historical value for keys '1' and '2'. The 'isDeleted' column indicates whether the row was deleted in the indicated version. In version 2, the value of the row with key '2' is changed from '20' to '8'. A new row is added to the history table with the version value '2'. In version 3, the data value with key '1' is changed from '10' to '6'. A new row is added to the history table with version value '3'. However, to properly retrieve a snapshot of the table T at version 2, a query with aggregates, joins, and sub-queries is required:

```
SELECT key, data FROM HT wanted WHERE
    isDeleted=false AND (wanted.version=2 OR
    wanted.version=(SELECT MAX(lessThanWant-
    ed.version) FROM HT lessThanWanted WHERE
    lessThanWanted.version<=2 AND
    lessThanWanted.key=wanted.key))
```

Such a query requires considerable processing resources and is thus an inefficient approach.

Accordingly, there exists a need for a method and system for efficient snapshot querying. The method and system should be able to retrieve a snapshot without requiring a query with aggregates, joins, or sub-queries. It should also significantly reduce overhead requirements. The present invention addresses such a need.

SUMMARY OF THE INVENTION

A method and system for efficient snapshot querying include: providing a first version value for each data in a history table, where the first version value indicates a beginning of a period in which the data is valid; providing at least a second version value for each data in the history table, where the second version value indicates an end of the period in which the data is valid; receiving a request for a version of a database; and retrieving the data with the first version value less than or equal to the requested version and the second version value greater than or equal to the requested version. By maintaining a history table with redundant version information, the method and system are able to provide efficient snapshot querying while also avoiding the overhead burden of conventional approaches. No aggregates, joins, or sub-queries are required to retrieve a snapshot.

BRIEF DESCRIPTION OF THE FIGURES

FIG. 1 illustrates a conventional approach to snapshot querying.

FIG. 4 illustrates an example snapshot querying in accordance with the present invention.

FIGS. 7 through 9 illustrate examples of the maintenance of the history table in accordance with the present invention.

DETAILED DESCRIPTION

The present invention provides a method and system for efficient snapshot querying. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 9 in conjunction with the discussion below.

Figure 2:
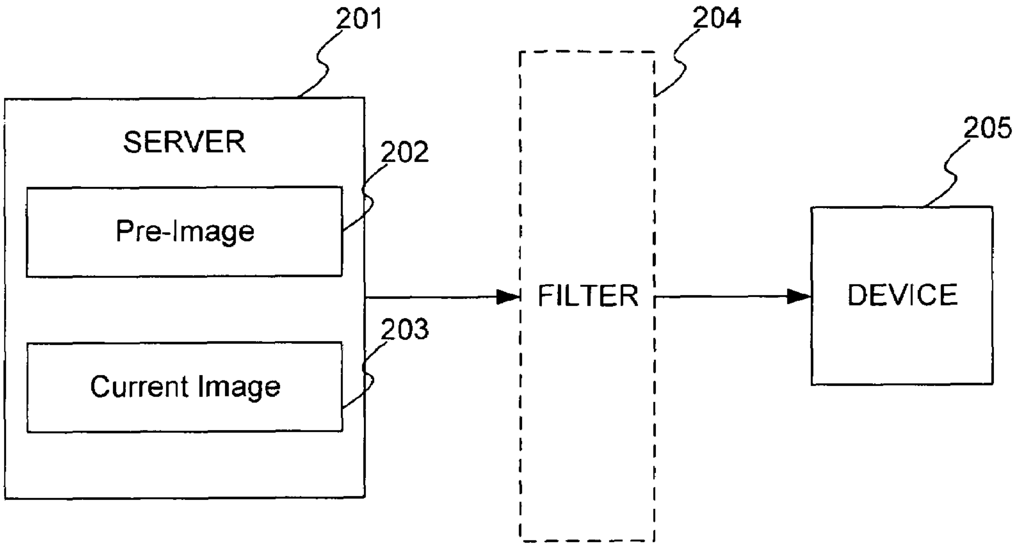
FIG. 2 illustrates an embodiment of a system for efficient snapshot querying in accordance with the present invention.

FIG. 2 illustrates an embodiment of a system for efficient snapshot querying in accordance with the present invention. The system includes a server 201 or anything that stores data and a device 205 that stores a subset of the data stored on the server 201. Occasionally, the device 205 connects to the server 201 to synchronize its copy of the subset with that stored at the server 201. The subset is defined by a filter 204. The server 201 is capable of determining a pre-image 202 of the data on the device 205 after a previous synchronization. During a current synchronization, the server 201 determines the current image 203 of the data according to the filter 204, i.e., the data the device 205 should have after the synchronization. Next, the server 201 determines a delta of the current image 203, where the delta includes data that changed since the previous synchronization and that exists in the current image 203. The server 201 then instructs the device 205 to delete the data that exists in the pre-image 202 but not in the current image 203. The server 201 further instructs the device 205 to UPSERT the union of the data that exists in the delta and the data that exists in the current image 203 but not in the pre-image 202. The UPSERT operation is an operation on a row (R) to a target table (T) with the following properties: 1. Before performing the UPSERT operation, if R is already in T, the UPSERT operation is logically equivalent to an SQL UPDATE operation. 2. Before performing the UPSERT operation, if R is not in T, the UPSERT operation is logically equivalent to an SQL INSERT operation.

Although the present invention is described in the context of the system illustrated in FIG. 2, one of ordinary skill in the art will understand that the present invention can be applied to other types of systems without departing from the spirit and scope of the present invention.

Figure 3:
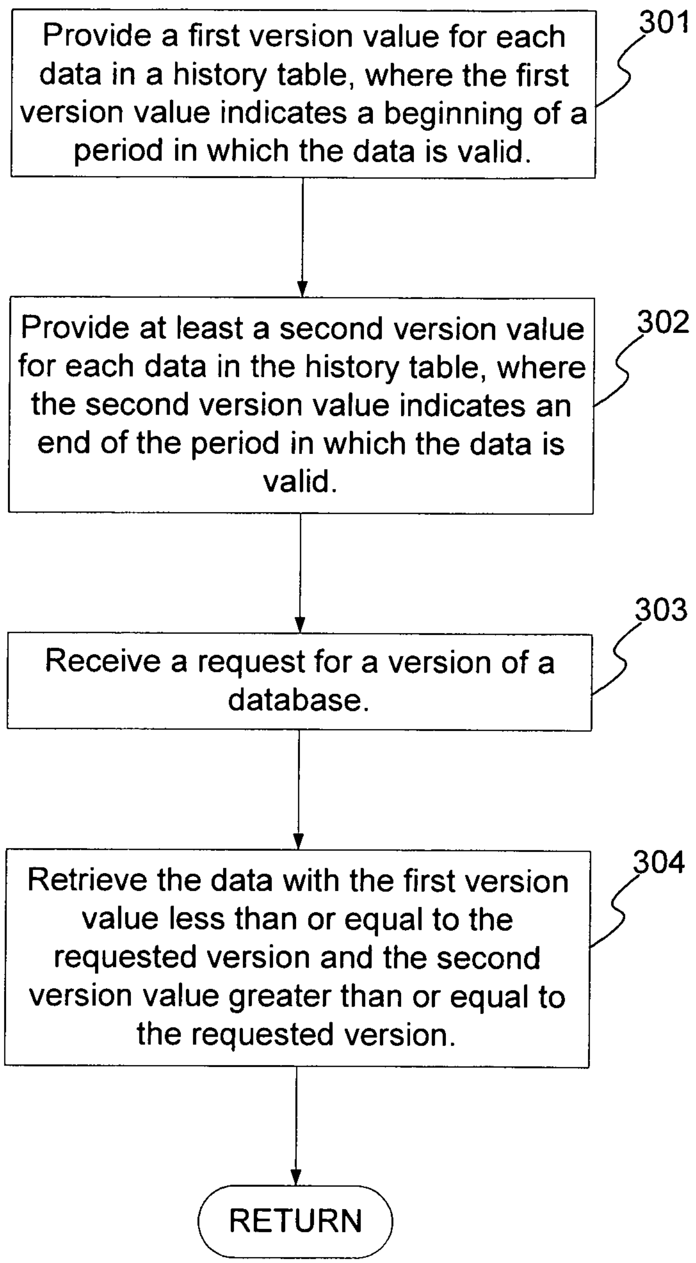
FIG. 3 is a flowchart illustrating an embodiment of the method for efficient snapshot querying in accordance with the present invention.

Important to the calculation of the pre-image 202 is the retrieval of a snapshot of the data in the database tables. FIG. 3 is a flowchart illustrating an embodiment of the method for efficient snapshot querying in accordance with the present invention. First, a first version value for each data in a history table is provided, where the first version value indicates a beginning of a period in which the data is valid, via step 301. The history table is maintained at the server 201. Also, at least a second version value is provided for each data in the history table, where the second version value indicates an end of the period in which the data is valid, via step 302. Optionally, more than two version values can be used. When a request for a version of a database is received, via step 303, the data retrieved is that which has a first version value less than or equal to the requested version and a second version value greater than or equal to the requested version, via step 304.

FIG. 4 illustrates an example data table, T, and its corresponding history table, HT. Version 1 includes data values '10' and '20' with keys '1' and '2', respectively. In the history table, each data value has a corresponding first version value, 'from', and a corresponding second version value, 'to'. In version 1, the 'from' value is '1' for both data values '10' and '20'. Their 'to' values are set to an adequately large value, denoted here symbolically by infinity.

In version 2, the data value in table T with key '2' is changed from '20' to '8'. A new row is then added to the history table for key '2'. The first version value, 'from', for this data value is set to '2', via step 301, and the second version value, 'to', is set to infinity, via step 302. The 'to' value for the old data value for key '2' is also changed to '1'. In this manner, the version values for the old data value '20' indicate that the old data value is valid from version 1 to version 1, i.e., only for version 1. The version values for the new data value '8' indicate that the new data value is valid from version 2 onward.

In version 3, the data value in table T with key '1' is changed from '10' to '6'. A new row is then added to the history table for key '1'. The 'from' value for this data value is set to '3', via step 301, and the 'to' value is set to infinity, via step 302. The 'to' value for the old data value '10' is also changed to '2'. In this manner, the version values for the old data value '10' indicate that the old data value is valid from version 1 to version 2. The version values for the new data value '6' indicate that the new data value is valid from version 3 onward.

Assume that server 201 then receives a request for version 2 of the database, via step 303. The rows $\{1, 10, 1, 2\}$ and $\{2, 8, 2, \infty\}$ have 'from' values<=2 and 'to' values>=2. The data values '10' and '8' (and their corresponding keys) are then retrieved, via step 304. The query required for retrieving this snapshot is as follows:

```
SELECT key, data FROM HT WHERE
    isDeleted=false AND from<=2 AND 2<=to
```

Unlike the conventional approach, no aggregates, joins, or sub-queries are required to retrieve the snapshot. Thus, by maintaining a history table with redundant version information as described above, the method and system in accordance with the present invention are able to provide efficient snapshot querying while also avoiding the overhead burden of conventional approaches.

Figure 5:
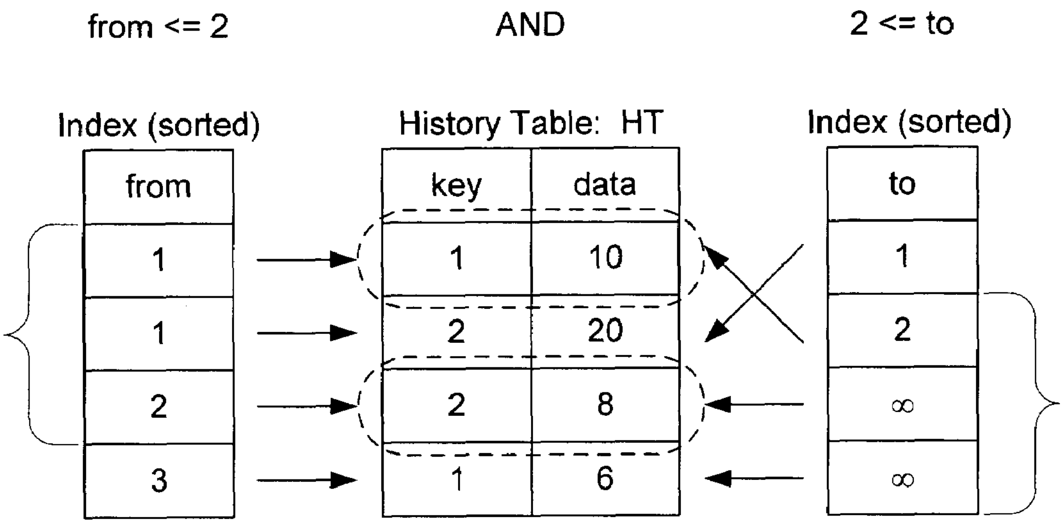
FIG. 5 illustrates the example set forth in FIG. 4 with version values indexed and sorted.

To further improve the efficiency of the snapshot querying, index scanning can be used in the retrieval of the snapshot. FIG. 5 illustrates the example set forth in FIG. 4 with the 'from' and 'to' version values indexed and sorted. Because the 'from' version value is indexed, the entries in the history table can be sorted accordingly and only the left bracketed rows need to be scanned. Similarly, because the 'to' version value is indexed, the entries in the history table can be sorted accordingly and only the right bracketed rows need to be scanned. The resulting bitmaps of the two index scans are then combined using a bitwise AND operation to obtain the final result.

Figure 6:
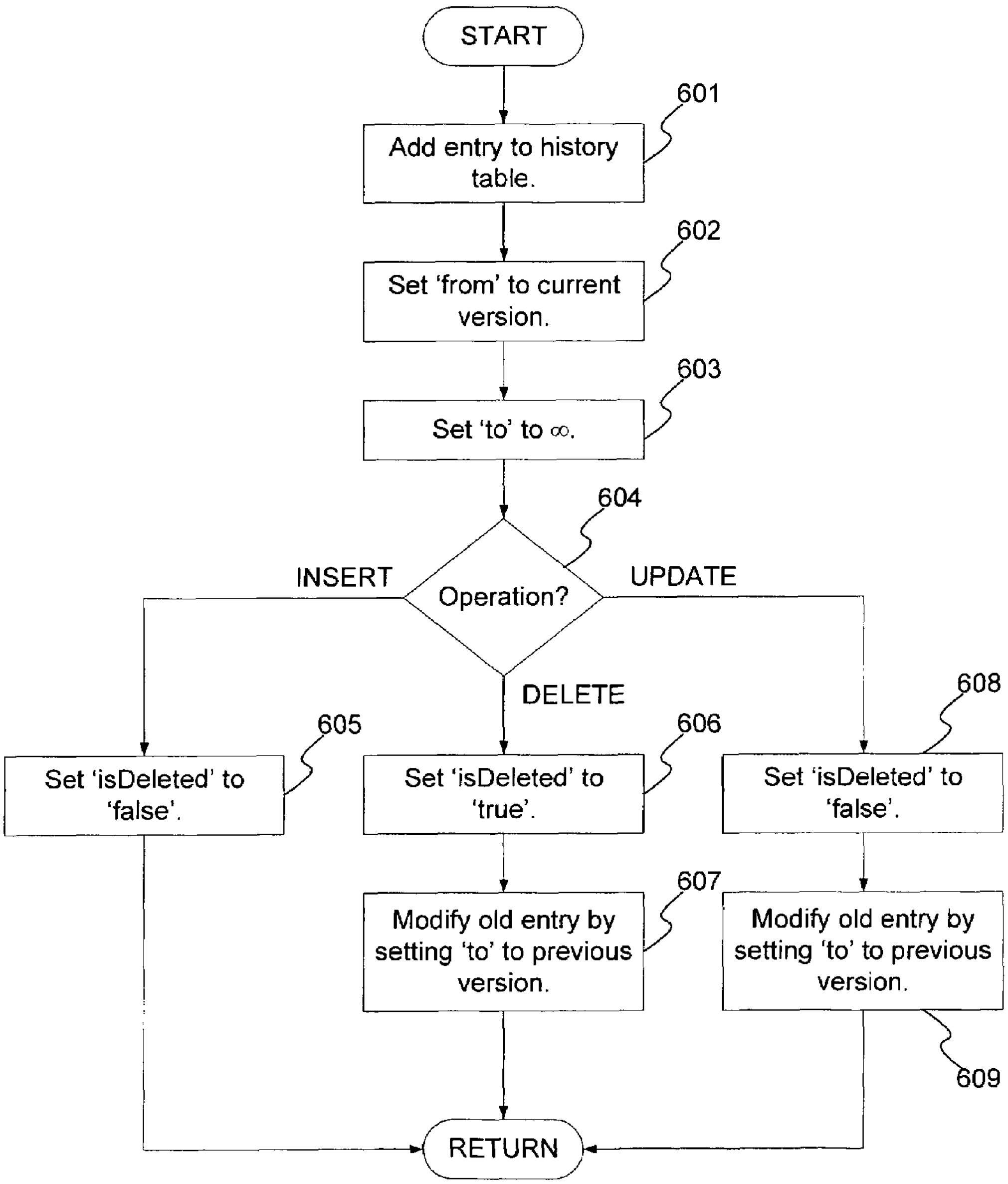
FIG. 6 is a flowchart illustrating the maintenance of the history table in accordance with the present invention.

FIG. 6 is a flowchart illustrating the maintenance of the history table in accordance with the present invention. With each change to a row in the data table, a row is added to the history table, via step 601. The 'from' version value of the added row is then set to the current version, via step 602, and the 'to' version value is set to infinity, via step 603. If the operation on the data table is a row insert, then the 'isDeleted' value for the added row is set to 'false', via step 605. If the operation is a row delete, then the 'isDeleted' value for the added row is set to 'true', via step 606, and the old row is modified by setting the 'to' version value to the previous version, via step 607. Here, the old row is the row in the history table with the same key and with a 'to' version value of infinity. If the operation is a row update, then the 'isDeleted' value for the added row is set to 'false', via step 608, and the old row is modified by setting the 'to' version value to the previous version, via step 609.

For example, FIG. 7 illustrates a row insert in accordance with the present invention. Here, the previous version is version '3'. A new row is inserted into the data table, T, with key '3' and data value '30'. This change to table T occurs when the value of the version is '4'. A row is then added to the history table, HT, via step 601. For this added row, the key is '3' and the data value is '30'. The 'from' version value is set to the current version '4', via step 602, the 'to' version value is set to infinity, via step 603, and the 'isDeleted' value is set to 'false', via step 605. The added row thus indicates that the row with key '3' and data value '30' is valid from version 4 onward.

Figure 8:
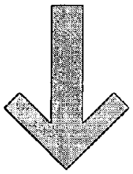

Referring to FIG. 8, assume that next, the row with key '1' and data value '6' is deleted from table T. Here, the previous version is '4', and the current version is '5'. A row is then added to the history table, via step 601. For this added row, the key is '1' with no data value. The 'from' version value is set to the current version '5', via step 602, and the 'to' version value is set to infinity, via step 603. Also, the 'isDeleted' value is set to 'true', via step 606, and the old row in the history table (with key='1' and data value='6') is modified by setting the 'to' version value to the previous version '4', via step 607. The added row thus indicates that the row in table T with key '1' was deleted in version 5 and is not in table T from version 5 onward. The modified old row in the history table indicates that the row in table T with key '1' and data value '6' is valid from version 3 to version 4.

Figure 9:
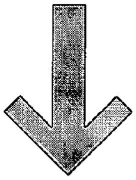

Referring to FIG. 9, assume that next, the row in table T with key '3' and data value '30' is updated to data value '888'. Here, the previous version is '5', and the current version is '6'. A row is then added to the history table, via step 601. For this added row, the key is '3' and the data value is '888'. The 'from' version value is set to the current version '6', via step 602, and the 'to' version value is set to infinity, via step 603. Also, the 'isDeleted' value is set to 'false', via step 608, and the old row in the history table (with key='3' and data value='30') is modified by setting the 'to' version value to the previous version '5', via step 609. The added row in the history table thus indicates that the row in table T with key '3' and data value '888' is valid from version 6 onward. The modified row in the history table indicates that the row in table T with key '3' and data value '30' is valid from version 4 to version 5. The snapshot of any version can then be retrieved as described above.

A method and system for efficient snapshot querying have been disclosed. By maintaining a history table with redundant version information, the method and system are able to provide efficient snapshot querying while also avoiding the overhead burden of conventional approaches. No aggregates, joins, or sub-queries are required to retrieve a snapshot.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for querying for a database snapshot with more than one version without requiring a query having aggregates, joins, and sub-queries, comprising:

providing a first version value for each data in a history table having redundant version information, wherein the first version value indicates a beginning of a period in which the data is valid;

providing at least a second version value for each data in the history table, wherein the second version value indicates an end of the period in which the data is valid;

receiving a request for a version of a database;

retrieving the data by:

performing a series of indexed scans including:

a first scan of rows in the history table for rows with the first version value less than or equal to the requested version;

a second scan of rows in the history table for rows with the second version value greater than or equal to the requested version; and determining an intersection of the first and second scans, wherein the retrieved data each has a Boolean value;

wherein the adding further comprises:

determining that the change is a row insert; and setting a delete Boolean value for the added row to 'false';

determining that the change is a row delete; and setting a delete Boolean value for the added row to 'true';

modifying an old row in the history table for a key of the changed row by changing its second version value to a previous version;

determining that the change is a row update; and setting a delete Boolean value for the added row to 'false'; and modifying an old row in the history table for a key of the changed row by changing its second version value to a previous version and, providing a response to the request received.

2. The method of claim 1, further comprising: determining that a change in a row in the database has occurred; and adding a row to the history table corresponding to the changed row, wherein the adding comprises: setting the first version value for the added row to a current version, and setting the second version value for the added row to a significantly large number.

3. The method of claim 1, wherein the retrieving comprises: performing a first scan of rows in the history table for rows with the first version value less than or equal to the requested version; performing a second scan of rows in the history table for rows with the second version value greater than or equal to the requested version; and determining an intersection of the first and second scans.

4. The method of claim 3, wherein the first and second scans are indexed scans.

5. The method of claim 1, wherein the retrieved data each has a delete Boolean value of 'false'.

* * * * *